SR

OR 3,877,777

United Stat

Glenn, Jr.

[11] 3,877,777

[45] Apr. 15, 1975

[54] BEAM EXPANDER SUBSYSTEM FOR FILM SCANNER

[75] Inventor: William E. Glenn, Jr., Stamford, Conn.

[73] Assignee: Columbia Broadcasting System, Inc., New York, N.Y.

[22] Filed: Nov. 15, 1972

[21] Appl. No.: 306,915

[52] U.S. Cl. .................... 350/7; 350/190; 350/285

[51] Int. Cl. .................... G02b 17/00

[58] Field of Search .................... 350/7, 6, 190, 285; 178/7.6

[56] References Cited

UNITED STATES PATENTS

| | | | |
|---|---|---|---|
| 2,588,740 | 3/1952 | Malm | 178/7.6 X |
| 2,692,370 | 10/1954 | Moore | 350/7 |
| 3,316,348 | 4/1967 | Hufnagel et al. | 350/7 UX |
| 3,436,546 | 4/1969 | Derderian et al. | 178/7.6 X |
| 3,576,357 | 4/1971 | Levy | 350/190 |
| 3,647,956 | 3/1972 | Buck | 350/7 |
| 3,762,793 | 10/1973 | Ullstig | 350/6 |
| 3,787,107 | 1/1974 | Sick | 350/7 |

*Primary Examiner*—Alfred E. Smith
*Assistant Examiner*—Michael J. Tokar
*Attorney, Agent, or Firm*—Martin Novack; Spencer E. Olson

[57] ABSTRACT

The invention pertains to an apparatus for recording an image on a film in a horizonttal line pattern with a modulated light beam, the scanned pattern being achieved using an optical horizontal scanner followed ultimately by a vertical scanning means. The invention comprises an improved optical beam expander system that effectively reduces horizontal scanline non-uniformities. A first one-dimensional beam expander expands the beam in the horizontal reference direction before the horizontal scanning thereof. A second beam expander is provided to receive the horizontally scanned beam and one-dimensionally expand the beam in the vertical reference direction before the scanning thereof on the film. In this manner, undesired perturbations introduced in the vertical reference direction by the horizontal scanning means are effectively reduced by a factor that relates to the vertical beam expansion ratio.

10 Claims, 3 Drawing Figures

BEAM EXPANDER SUBSYSTEM FOR FILM SCANNER

BACKGROUND OF THE INVENTION

This invention relates to apparatus for reading or recording an image on a film in a scanned line pattern with a light beam and, more particularly, to a system for improving horizontal scanline uniformity in such a pattern.

Various equipments have been developed which utilize a laser beam for reading or recording images on film. For example, an unmodulated laser beam can be scanned over a film at a precisely controlled rate and the transmitted portion of the beam measured by a photodetector. The varying optical densities of the different areas of the film act to amplitude modulate the laser beam and the photodetector output generates a video signal representative of the film data. The video signal can be transmitted to a remote location and the original film data reproduced using a recorder apparatus. In the recorder, the video signal is used to amplitude modulate a laser beam which is scanned at a precise rate over unexposed film. In this manner, the original film information can be reproduced at the remote location.

One common type of recorder apparatus employs a multi-faceted spinning mirror or prism to achieve image reproduction. In such apparatus the image is reconstructed on the film medium by causing the focused laser beam to traverse the medium in a closely spaced horizontal scanline pattern. Typically, one or more facets of the spinner are utilized to form a single scanline on the film. In one equipment version, the film is moved in a direction that is approximately parallel to the spinner's axis of rotation, so vertical incrementation is achieved by the movement of the film.

Another type of apparatus which employs a spinner to achieve horizontal scanlines is described in an article entitled "Laser Beam Recorder for Color Television Film Transfer" by L. Beiser, W. Lavender, R. H. McMann, and R. Walker, which appeared in the September, 1971 issue of *The Journal of the Society of Motion Picture and Television Engineers*. In the recorder of the referenced article, the television video signal is used to independently modulate three superimposed monochromatic laser beams which form a resultant multi-color beam that is scanned at a precise rate over unexposed film. In this equipment, however, the film is stationary during the recording of each frame. Vertical incrementation is accomplished by an optical scanner in the form of a galvanometer mirror. Having been imparted with the appropriate horizontal and vertical deflections, the beam is focused on the film to perform selective exposure of the colored emulsion layers.

A problem that is characteristic of recorders employing rotating optics for horizontal scanning is a degradation of scanline uniformity that results from wobbling or jittering of the spinner. Typically, the most undesirable jitter component occurs in a direction parallel to the spinner's rotation axis; i.e., in the vertical reference direction. The resultant variations in the vertical spacing of horizontal scanlines are manifested as a noticeable density variation on the film. A system for electro-optically correcting problems of this type is disclosed in the copending U.S. Patent application Ser. No. 298,607 of W. Harris and R. Walker entitled "Banding Correction System for Film Recording Apparatus," filed Oct. 18, 1972 now U.S. Pat. No. 3,809,807, and assigned to the same assignee as the present application. In that application, means are described for sensing the beam position at the beginning of each horizontal scanline and for developing a correction signal based on a calculated positional error. The correction signal is fed back to an electro-optic deflector which compensates the beam's vertical position to reduce scanline registration errors. The system of that application has been found to operate satisfactorily but has the disadvantage of requiring additional components and circuitry in an already complex and expensive apparatus. Accordingly, it is an object of the present invention to improve the horizontal scanline uniformity of an optical recorder system, but without requiring additional electro-optic equipment in doing so.

SUMMARY OF THE INVENTION

The present invention reduces horizontal scanline non-uniformities by optical means. The invention makes use of an already existing need to expand the original laser beam before the scanning thereof. Such expansion is conventionally performed in equipment of the type described to increase beam aperture at the scanners and, consequently, increase the equipment's resolution capabilities. The conventional technique of beam expansion involves an enlargement of the beam's diameter (i.e., a two-dimensional enlargement) before the beam is scanned in either the horizontal or vertical directions. This is typically done by employing a beam expander having spherical lenses. In this invention the beam expansion operation is achieved as two separate one-dimensional expansions and, in doing so, an advantage in performance is gained. Specifically, angular perturbations introduced to the scanning beam by spinner jitter are reduced or "demagnified" by judicious use of beam expansion in a reference direction that corresponds to the direction of the perturbation.

The present invention pertains to an apparatus for scanning a film in a horizontal line pattern with a light beam, the scanned pattern being achieved using an optical horizontal scanner followed ultimately by vertical scanning means. The invention comprises an improved optical beam expander system that effectively reduces horizontal scanline non-uniformities. In accordance with the invention, first means are provided for one-dimensionally expanding the beam in the horizontal reference direction before the horizontal scanning thereof. Second means are provided for receiving the horizontally scanned beam and for one-dimensionally expanding the beam in the vertical reference direction before the scanning thereof on said film. In this manner, undesired perturbations introduced in the vertical reference direction by the horizontal scanning means are effectively reduced by a factor that relates to the vertical beam expansion ratio.

Further features and advantages of the invention will become more readily apparent from the following detailed description when taken in conjunction with the accompanying drawings.

BRIEF DESCRIPTION OF THE DRAWINGS

F.G. 1 is a simplified schematic diagram of a type of film scanning system in which the invention can be advantageously utilized.

DESCRIPTION OF THE PREFERRED EMBODIMENT

Figure 1:
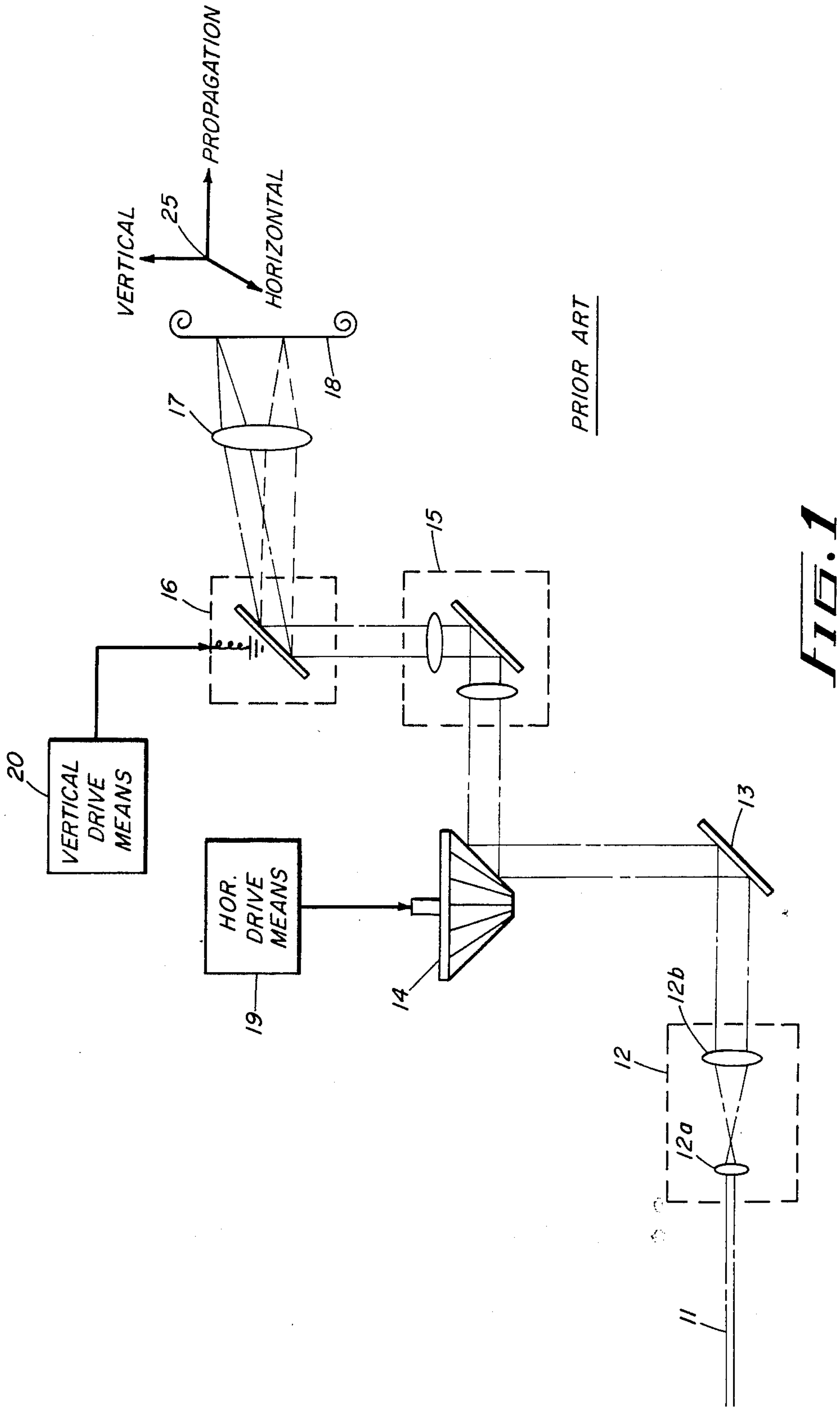

As a foundation for disclosing the invention in detail, it is helpful to describe generally the operation of one type of prior art system in which the invention can be advantageously utilized. FIG. 1 is a simplified schematic diagram of the type of laser recorder system described in the above-referenced *SMPTE* article. An intensity-modulated laser beam 11 is passed through a beam expander 12 and reflected from a stationary mirror 13 towards an optical spinner 14. After deflection off the spinner surface the beam passes through a unity-magnification telescope 15 and is then deflected from a galvanometer mirror 16. The beam is then focused by objective lens 17 onto a film 18 which is selectively exposed in accordance with the beam intensity. The optical spinner 14 and galvanometer mirror 16 are respectively driven by appropriate horizontal and vertical drive means 19 and 20. In describing the operation of the system of FIG. 1, and later the operation of the invention, it is helpful to establish reference directions that relate to the recording beam as it travels through the system and to the film which it ultimately exposes in a line pattern. These reference directions can be visualized from the mutually orthogonal axes 25 in FIG. 1 (and later in FIG. 2). In the drawings the film 18 is viewed from its edge and can be thought of as lying in a plane perpendicular to the plane of the paper.

Within the plane of the film, the vertical direction is defined as being coincident the length of the film. The horizontal direction is defined as being transverse the film; i.e. perpendicular to the length of the film. Thus, the successive scanlines are horizontally oriented and displaced vertically, one below another. When the beam inpinges on the film it is substantially perpendicular to the plane of the film and can be considered as having a direction of propagation that is orthogonal to the previously defined vertical and horizontal directions. During its progress toward the film the beam may change direction such as when it is reflected from the stationary mirror 13. However, the vertical and horizontal reference directions with respect to the beam propagation direction are defined as those directions which ultimately correspond to their vertical and horizontal counterparts at the film.

Having defined reference directions, the prior art equipment of FIG. 1 can be described in some further detail. As is common practice, the modulated laser beam 11 is two-dimensionally expanded to a larger diameter beam by beam expander 12. Typically, spherical lenses such as those depicted as 12*a* and 12*b* are employed to achieve expansion in both the horizontal and vertical reference directions. As is well known, the expansion of the beam aperture before scanning increases the scanner's resolution capability. The beam is subsequently deflected in the horizontal reference direction by spinner 14. The unity magnification telescope 15 causes the light bundle from the spinner facet to remain still on the galvanometer mirror face so that only the beam's horizontal angle of incidence varies at this point. Suitable telescope optics are disclosed, for example, in U.S. Pat. No. 3,625,585. The galvanometer mirror 16 imparts the desired vertical deflection to the beam to achieve a relatively uniform line pattern on the film. Two representative bundles of rays are shown in FIG. 1 to illustrate vertical deflection.

As previously noted, a problem that is characteristic of recorders of the type described is a degradation of scanline uniformity that results from wobbling or jittering of the spinner. The perturbations introduced to the beam by the spinner jitter are along the vertical reference direction, so the beam's vertical position (and the resultant position of the horizontal line being recorded) are undesirably displaced.

Figures 2, 3:
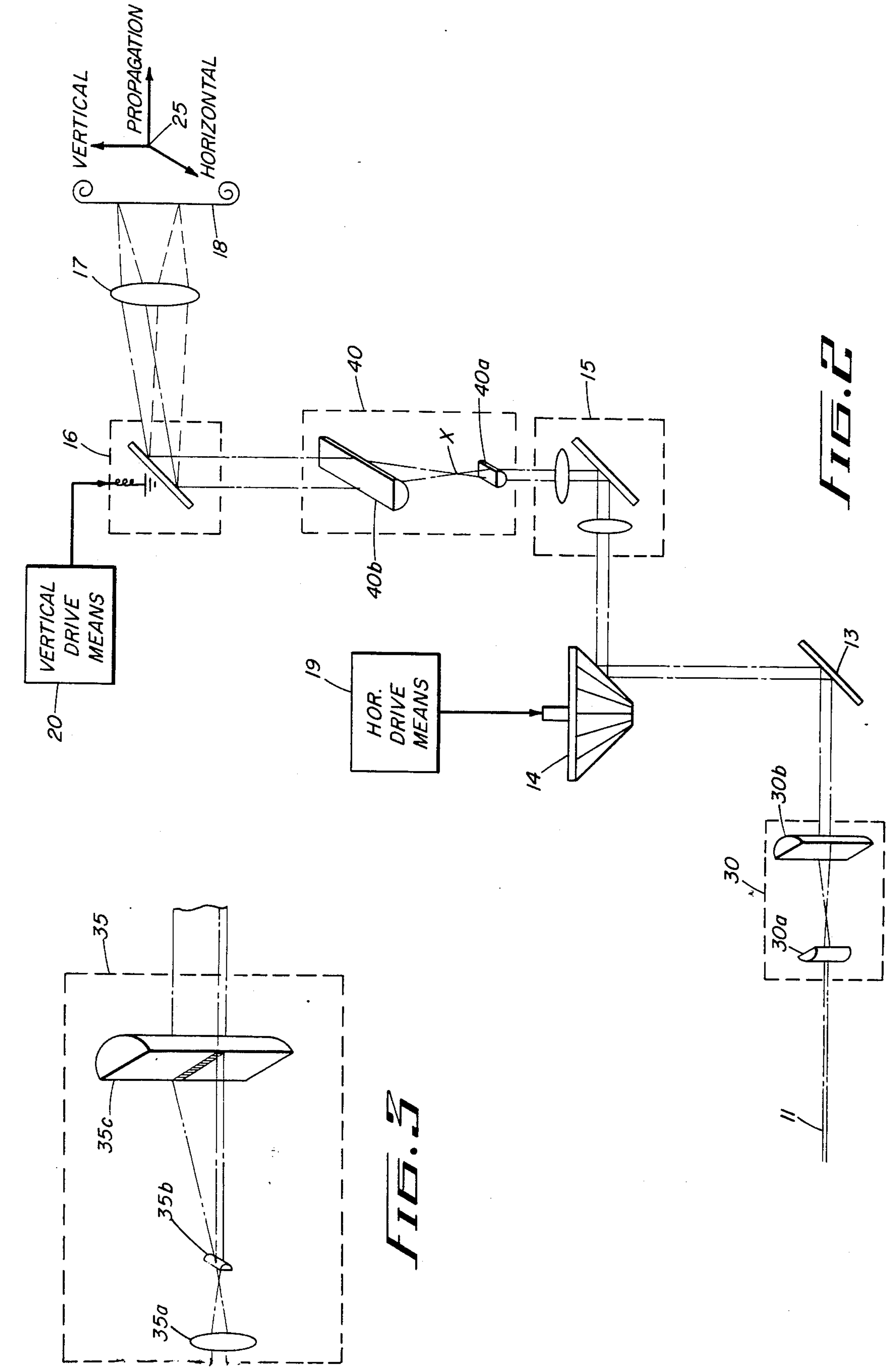
FIG. 2 is a schematic diagram of a film scanning system which employs the improved optical beam expander system of the invention.
FIG. 3 is a schematic diagram of an alternate construct for a portion of the embodiment of FIG. 2.

Referring to FIG. 2 there is shown an embodiment of an improved optical beam expander system which reduces horizontal scanline non-uniformities in a film recording apparatus. In the system of the invention modulated laser beam 11 is passed through a one-dimensional beam expander 30 wherein it is expanded in the horizontal reference direction. The one-dimensional expansion may be achieved using cylindrical lenses 30*a* and 30*b* having the desired focal length ratio. The horizontally expanded beam is reflected from mirror 13 and then deflected off spinner 14 to impart the desired horizontal scan. After passage through the unity magnification telescope 15, the beam is expanded in the vertical reference direction by one-dimensional beam expander 40 which may comprise cylindrical lenses 40*a* and 40*b*. The beam is then vertically scanned by galvanometer mirror 16 and focused on film 18 by an objective lens 17.

The optical beam expander arrangement of FIG. 2 substantially reduces vertical positional errors of the scanning beam at the film as compared to the vertical positional errors that would occur in the prior art system of FIG. 1 using the same optical spinner. The reduction of error is proportional to the magnification of the vertical beam expander 40 which acts to demagnify angular perturbations of the beam previously introduced in the vertical reference direction such as by the spinner 14. This demagnification can be visualized by assuming that the beam leaving the spinner has had introduced thereto a vertical angular error $\alpha$. In the equipment of FIG. 1 this error would be carried through subsequent optics and result in an angular error of $\alpha$ in the beam impinging on the film. In the invented system, however, the beam expander 40 effectively demagnifies $\alpha$ in proportion to the expansion ratio $$M = f_b/f_a$$

where $f_b$ is the focal length of lens 40*b* and $f_a$ is the focal length of lens 40*a*. To illustrate, if the beam entering expander 40 has a vertical angular error $\alpha$ there will be a resultant vertical displacement error of approximately $$D = \alpha f_a$$

at the focal point $x$ of lens 40*a*. The point $x$ is also the focal point of lens 40*b*, so the vertical angular error $\beta$ of the beam leaving the expander 40 must be $$\beta = D/f_b = \alpha f_a/f_b = \alpha/M$$

Thus, for example, an expansion ratio of 8 to 1 will reduce vertical angular errors to 1/8 of their original values.

The embodiment of FIG. 2 describes a system wherein overall horizontal and vertical expansion are implemented. However, the principles of the invention are applicable to a system wherein no horizontal expansion is performed before horizontal scanning, as would be in the case of FIG. 2 if the beam expander 30 were omitted. In such instance, any undesired vertical angular perturbations produced by the spinner would still be demagnified in the manner described.

Similarly, the advantages of the invention can be gained in a system where no net vertical beam expansion (or even a net beam compression) is desired. This can be achieved by compressing the beam in the vertical reference direction before the subsequent horizontal scanning and vertical expansion thereof. FIG. 3 shows an anamorphic beam compressor/expander 35 that could replace the expander 30 of FIG. 2 in an apparatus where no net vertical expansion is desired. The unit 35 expands the beam in a horizontal reference direction while compressing it in a vertical reference direction. This is accomplished using a spherical lens 35*a* followed by cylindrical lenses 35*b* and 35*c*, the cylindrical lenses being orthogonally oriented and of the desired focal length ratios with respect to the spherical lens. The lens 36*b* should have a proportionately shorter focal length than the spherical lens and be oriented to one-dimensionally compress in the vertical reference direction. The lens 35*b* has a focal length that is proportionately longer than that of the spherical lens and is oriented to expand the beam in the horizontal reference direction.

The invention has been described with reference to a particular embodiment, but it will be appreciated that variations within the spirit and scope of the invention will occur to those skilled in the art. For example, it will be appreciated that the principles of the invention apply equally well to a system in which vertical scanning is achieved by moving the film rather than by vertically deflecting the beam. The benefits of effectively demagnifying vertical angular errors introduced by the horizontal scanning means accrue equally well to such systems. Further, it will be recognized that while vertical angular errors introduced by a rotating optical spinner are among the most common types of errors, the invention functions to demagnify vertical angular errors from any source prior to the vertical beam expander.

I claim:

1. In an apparatus for scanning a film in a horizontal line pattern with a light beam, the light beam being scanned in a horizontal reference direction by a moving optical scanner, an improved optical beam expander that effectively reduces horizontal scanline non-uniformities, comprising: means for receiving the horizontally scanned beam and for expanding said beam in the vertical reference direction before the scanning thereof on said film.

2. In an apparatus for scanning a film in a horizontal line pattern with a light beam, the scanned pattern being achieved using an optical horizontal scanner followed ultimately by a vertical scanning means; an improved optical beam expander system that effectively reduces horizontal scanline non-uniformities, comprising:

first means for one-dimensionally expanding the beam in the horizontal reference direction before the horizontal scanning thereof; and second means for receiving the horizontally scanned beam and for one-dimensionally expanding said beam in the vertical reference direction before the scanning thereof on said film.

3. The system as defined by claim 2 wherein each of the one-dimensional beam expanding means comprises a pair of cylindrical lenses.

4. The system as defined by claim 2 further comprising means for one-dimensionally compressing the beam in a vertical reference direction before the horizontal scanning thereof.

5. In an apparatus for reading or recording an image on a film in a scanned horizontal line pattern with a collimated light beam, the scanned pattern being achieved using an optical horizontal scanner followed ultimately by vertical scanning means; an improved optical beam expander system that effectively reduces horizontal scanline non-uniformities, comprising:

first means for one-dimensionally expanding the beam in the horizontal reference direction before the horizontal scanning thereof; and second means for receiving the horizontally scanned beam and for one-dimensionally expanding said beam in the vertical reference direction before the scanning thereof on said film, the reduction of horizontal scanline non-uniformities being proportional to the expansion ratio of the beam expansion in the vertical reference direction.

6. The system as defined by claim 5 further comprising means for one-dimensionally compressing the beam in the vertical reference direction before the horizontal scanning thereof.

7. Apparatus for recording an image on a film in a scanned horizontal line pattern with a modulated light beam, comprising:

means for one-dimensionally expanding the beam in the horizontal reference direction;

an optical spinner for horizontally scanning the one-dimensionally expanded beam in the horizontal reference direction;

a second one-dimensional beam expander for expanding the horizontally scanned beam in the vertical reference direction; and means for vertically scanning the twice expanded beam on said film.

8. Apparatus as defined by claim 7 wherein said second one-dimensional beam expander comprises a pair of cylindrical lenses.

9. The apparatus as defined by claim 7 further comprising means for one-dimensionally compressing the beam in the vertical reference direction before the horizontal scanning thereof.

10. The apparatus as defined by claim 9 wherein said second one-dimensional beam expander comprises a pair of cylindrical lenses.

* * * * *